April 1, 1930.  H. A. TUTTLE  1,752,313
CLUTCH MECHANISM
Filed April 4, 1927
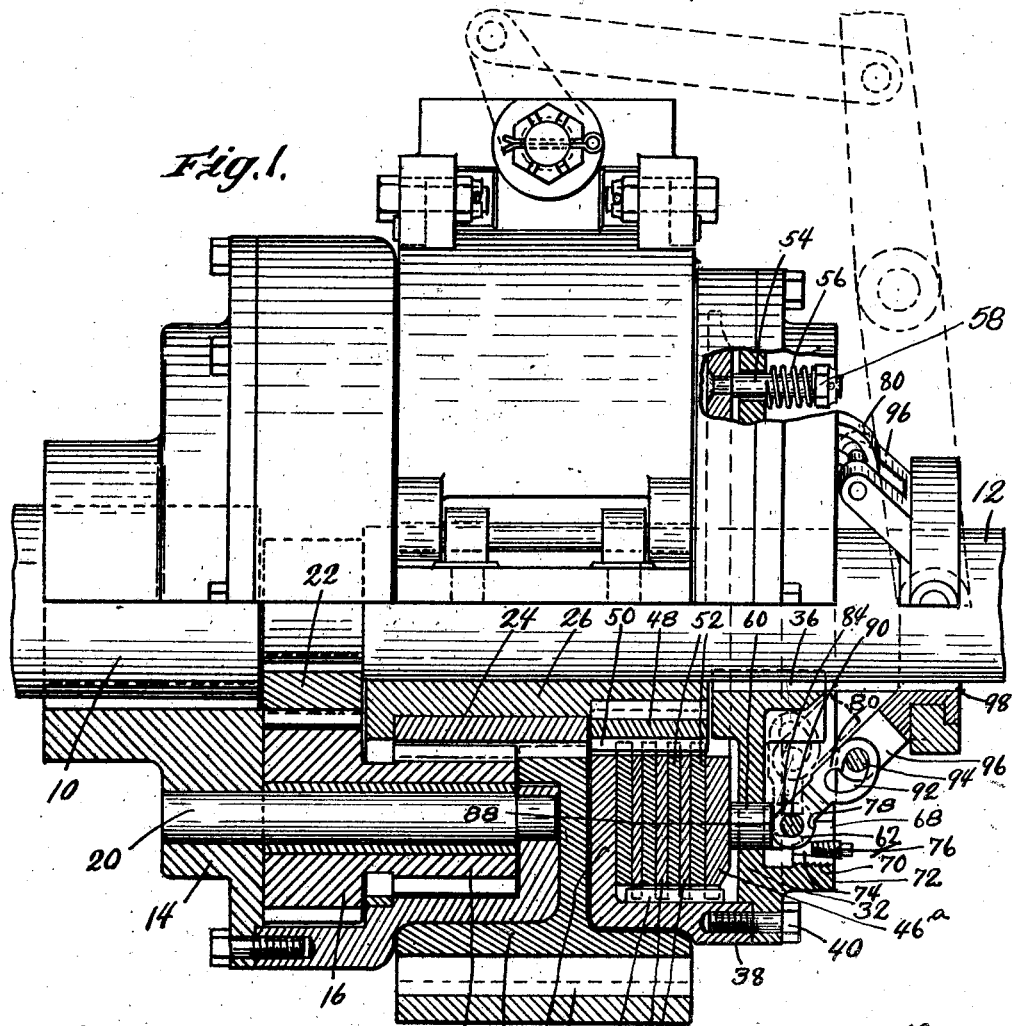
Fig.1.
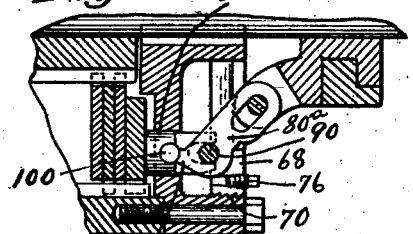
Fig.3.
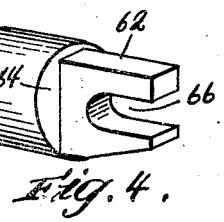
Fig.4.
Fig.5.
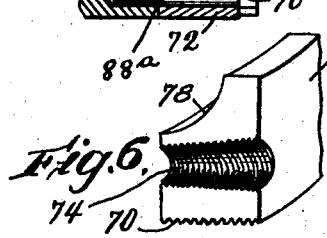
Fig.6.
Fig.2.
Inventor.
Henry A. Tuttle
by
atty Patented Apr. 1, 1930

1,752,313

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

CLUTCH MECHANISM

Application filed April 4, 1927. Serial No. 180,705.

This invention relates to clutch mechanisms especially adapted, although not necessarily restricted to use with reversing gearings and has for an obejct the provision of a novel form of clutch mechanism and operating mechanism that has but a relatively short axial extent.

A further object of the invention is the provision of an adjusting ring by which the pressure on the clutch plates can be regulated, together with clutch operating links which have a direct and rocking bearing on the adjustment ring.

A further object is generally to improve the construction and operation of clutch mechanism.

Fig. 1 is a side elevation partly in section of a reversing gearing having clutch mechanism embodying this invention.

Fig. 2 is a perspective view of one of the clutch operating links.

Fig. 3 is a sectional detail illustrating a modified form of clutch operating mechanism.

Fig. 4 is a perspective view of one of the clutch pins illustrated in Fig. 1.

Fig. 5 is a perspective view of a clutch pin illustrated in Fig. 3.

Fig. 6 is a fragmentary perspective view of one end of the split pressure-adjusting ring.

The invention as here shown is applied to a reversing gearing including the aligned driving and driven shafts 10 and 12 respectively. A planetary gear carrier 14 is fixed to said driving shaft and overlies the driven shaft. Sets of connected large and small gears 16 and 18 respectively are rotatably supported on pins 20 carried by said carrier. The large pinion gears 16 are arranged in constant mesh with a spur gear 22 fixed to the end of the driven shaft. The small pinion gears 18 are in constant mesh with a loose spur gear 24 which is rotatable on the hub 26 of the gear carrier 14, which hub also comprises a bearing-support for the end of the driven shaft. Said gear 24 is provided with a brake drum 28 that is adapted to be engaged by a brake band 30 to hold said drum and gear stationary to set the gearing for reverse drive.

Clutch mechanism embodying this invention is provided to connect said gear carrier and driven shaft directly for forward drive. Said clutch mechanism includes a clutch plate carrier comprising a circular plate 32, the hub of which is fixed to the driven shaft by means of a key 36. A cylindrical member or drum 38 is secured to the peripheral portion of said plate 32 by bolts 40. Said drum has a radially inwardly extended plate 42 which is spaced in parallel relation with said plate 32 and forms therewith an enclosure in which the clutch plates are contained and also comprises a support or abutment against which the clutch plates are pressed when the clutch is set for forward drive. Said drum is provided with internal gear teeth 44 and a set of clutch plates 46 have external gear teeth in their peripheries which mesh with and are slidable along said internal gear teeth 44. The hub 26 of said gear carrier 14 is provided with a second clutch plate carrier in the form of a ring 48 which is keyed to said hub. Said ring is provided with external gear teeth 50 and a set of clutch plates 52 having internal gear teeth are arranged in mesh with and are slidable on said gear teeth 50 and are spaced alternately with respect to the clutch plates 46. The outermost clutch plate 46ª of the first group preferably is thicker than the other clutch plates and forms a pressure plate against which the clutch engaging pressure is adapted to be applied. Said plate is held yieldingly out of clutch engaging position by means of pins 54, one of which is shown in Fig. 1, which are slidably extended through the plate 32 and are provided with compression springs 56 which bear against said plate 32 and nuts 58 carried by the ends of said pins.

Pressure is applied on said plate 46ª to set the clutch by means of cylindrical thrust pins 60 which are carried by and slidable axially in said plate 32 and have flat inner ends which are adapted to bear against the clutch plate 46ª. The outer ends of said thrust pin 60 are provided with axial extensions 62 in the middle thereof, which extensions have a height approximately equal to the diameter of the pins and a width which is materially less than the diameter of the pins whereby to provide flat cam faces at the base of the extensions and at opposite sides thereof. Said extensions are provided with axially-extended slots therein to receive guide pins of the clutch operating links.

The clutch operating mechanism includes a split adjusting ring 68 which is larger in external diameter than the circumference enclosing said pins 60 and has an externally screw-threaded periphery 70 which is adjustably screw-threaded in a cylindrical extension 72 of the plate 32 and is disposed in the rear of said pins 60. The ends of said ring terminate in close proximity to each other and a tapered screw-threaded passage 74 is formed in the proximate ends. A tapered externally screw-threaded plug 76 is received in said passage and is adapted to force the proximate ends of said ring apart whereby to crowd the ring against the cylindrical extension 72 and thereby to lock the ring adjustably in set position. The inner face of said ring is provided with a continuous annular groove 78 which is approximately semi-circular in cross section, as best illustrated in Fig. 6, and said inner groove is adapted to form a bearing seat for the clutch operating links.

A clutch operating swinging link 80 is associated with each thrust pin 60. The inner end or head of the link is bifurcated or provided with a slot 82, best shown in Fig. 2, that is adapted to receive the projection 62 of its cooperating thrust pin 60, and is adapted to be held against lateral displacement by said pin. The inner end 84 of said pin is approximately cylindrical in form but has a flat upper face 86 which is disposed somewhat above the center of the cylindrical formation so that toes 88 are formed that provide cam members adapted to bear against the bearing faces 64 of the pin 60. The distance from the flat face 86 to the center of the circular formation is less than the radius of the cylindrical face whereby to provide a lever action on the thrust pins 60. Said cylindrical face 84 of the head of the link has a rocking support and is socketed in the semi-circular annular groove 78 of the split ring 68. A guide pin 90 is extended through the cylindrical end 84 of the link and extends loosely through the slot 66 of the thrust pin 60 and prevents disengagement of said link and thrust pin and serves to maintain the link on its rocking seat against displacement therefrom.

The outer ends of said links are provided with slots 92 therein through which pins 94 are loosely extended. Said pins are carried by arms 96 of a clutch-operating sleeve 98 that is axially movable on the driven shaft 12 and is fixed thereon against free rotation by the key 36.

In the clutch-free condition of the mechanism, the links 80 are adapted to be approximately radially disposed as illustrated in the dotted lines, Fig. 1, and are adapted to be moved angularly outwardly into the full line position illustrated in Fig. 1 by a movement of the sleeve 98 to the right whereby to apply clutching pressure to the clutch plates and set the clutch for forward drive. When the links 80 are radial, the toes 88 thereof are free from operative bearing on the pins 60 and the springs 56 associated with the clutch plate 46ª hold the thrust pins against the flat sections 86 of the links and thereby hold the links against the pressure ring 68. When the links are moved outwardly, however, the toes 88 are caused to bear against the bearing faces 64 of the thrust pins whereby to move the pins axially and thereby to force the plates into clutching engagement. The links thus constitute thrust members for the thrust pins. The line of thrust on the links 80 is somewhat above the center of support of the links on the bearing face 78 of the pressure ring so that the links are adapted to remain in clutch-set position until moved therefrom. The slots 92 in the outer ends of said links are of such shape that when the links are in the radial position illustrated by the dotted lines, Fig. 1, the operating sleeve 98 is permitted a substantial amount of axial movement practically independent of the links and without operating the clutch for the purpose of setting the gearing for direct drive. When wear occurs between the clutch plates, the tapered plug 76 is adapted to be backed off slightly to release the clamping pressure on the split ring and the ring is adapted to be rotated sufficiently to take up the wear while maintaining its supporting relation with the links 80.

In the modified form of the invention, in Figs. 3 and 5, the bearing surfaces 64 of the thrust pins are replaced by cam pins 100 which are received in the thrust pins 60ª at right angles to the projections 62 so that a portion of the peripheries thereof are exposed at the bases of said projections. Said pins are loose in the thrust pins and thus act as rollers for the operating links.

The clutch operating links 80ª are provided with toes 88ª which are adapted to bear against said cam pins or rollers to set the clutch, the action being essentially the same as before. Said toes are provided with arcuate faces that conform with the rollers 100 and said rollers are adapted to be seated in said arcuate faces thereby to hold the clutch mechanism releasably in set condition.

The mechanism above described is compact and sturdy. The operating links are short and are normally radially disposed so that they occupy but a short axial extent. The use of pivot pins and the like is obviated and large bearing surfaces are provided between the links and the supporting pressure ring, so that wear is unlikely to occur rapidly; and the wear between the links and the ring is spread over the surface of the ring when the ring is rotated for pressure-adjustment.

The reversing gearing associated with this invention is disclosed and claimed in my co-pending application Serial No. 625,390, filed March 15, 1923, on which Patent No. 1,646,127 was issued October 18, 1927.

I claim:

1. Clutch mechanism including the combination of a casing having an end wall, clutch plates disposed therein on one side of said end wall, thrust pins associated with said clutch plates and extended slidably through said end wall, a ring opposed to said thrust pins and carried by said casing on the other side of said end wall and having an angularly-adjustable connection with said casing and having a continuous annular groove opposed to said thrust pins, and operating links having heads which are disposed between said annular groove and pins and are arranged to rock in said groove and to apply pressure on said thrust pins.

2. Clutch mechanism comprising the combination of an enclosing casing, clutch plates contained therein, a thrust pin carried by said casing and disposed to apply pressure on said clutch plates, an annular ring opposed to said thrust pin and having a rotatably adjustable connection with said casing, said ring having a continuous annular groove therein opposed to said thrust pin, and an operating link having a rocking bearing in said annular groove and a cam bearing on said thrust pin in opposition to said rocking bearing, said thrust pin having means engageable with said operating link to hold it in said rocking bearing.

3. Clutch mechanism comprising the combination of an axially movable thrust pin, clutch plates engaged by said pin, a stationarily supported angularly-adjustable ring having a continuous annular groove opposed to said thrust pin, an operating link having a cylindrical end disposed between said pin and ring and having a rocking bearing in the groove of said ring, said cylindrical end also having a cam bearing on said thrust pin, said thrust pin having a forwardly directed extension provided with an axially-extended slot therein, and said cylindrical head having a pin extended loosely into said slot.

4. Clutch mechanism comprising the combination of an axially movable thrust pin, clutch plates engaged by said pin at one end thereof, said pin at the other end having a forwardly directed extension and bearing faces on opposite sides and at the base of said extension, said extension having an axially-disposed slot therein, a stationarily-supported angularly-adjustable ring opposed to said pin and having a continuous annular groove of cylindrical transverse section in that face thereof opposed to said thrust pin, an operating link for said thrust pin having a bifurcated cylindrically-formed end received loosely over the extension of said thrust pin and having a rocking support in the annular groove of said ring, said cylindrical end having a pin which is extended loosely into the slot of said extension.

5. Clutch mechanism comprising the combination of an axially movable thrust pin, a stationary pressure ring having an annular groove therein opposed to said pin, an operating link having a head one end of which is socketed in said groove and the other end of which has a pressure-bearing on said pin, said pin and said head having loosely inter-engaging parts which hold said link in said groove, and an axially-movable sleeve fixed to rotate with said pressure ring having a pin and slot connection with said link and also having an arm that engages said link and restrains it from bodily movement laterally.

6. Clutch mechanism comprising the combination of a shaft, a cylindrical enclosing drum co-axial with said shaft having internal screw threads at one end and an intermediately-disposed inwardly-directed wall, clutch plates contained in said drum on the side of said wall opposite said screw threads, thrust pins for said clutch plates axially movable in said wall, a pressure ring having external screw threads received in the screw threads of said drum, said ring having confronting ends and means to spread said ends apart whereby to lock said ring in any set position thereof within said drum, said ring also having an annular groove in that face thereof opposed to said wall, links having heads at their outer ends which are socketed at one end in the groove of said ring and at the other end have pressure bearings on said pins, the inner ends of said links being movable inwardly and outwardly through said ring, and a sliding sleeve on said shaft having pivotal connections with the inner ends of said links, whereby to reciprocate them and operate the clutch.

In testimony whereof, I have signed my name to this specification.

HENRY A. TUTTLE.